United States Patent
Hammad

(10) Patent No.: US 6,701,283 B2
(45) Date of Patent: Mar. 2, 2004

(54) APPARATUS FOR PROCESSING ITEMS OF ELECTRONIC EQUIPMENT

(75) Inventor: Abdelhakeem A. Hammad, Limerick (IE)

(73) Assignee: Dell Products L.P., Round Rock, TX (US)

( * ) Notice: Subject to any disclaimer, the term of this patent is extended or adjusted under 35 U.S.C. 154(b) by 257 days.

(21) Appl. No.: 09/858,024

(22) Filed: May 15, 2001

(65) Prior Publication Data

US 2003/0195711 A1 Oct. 16, 2003

(51) Int. Cl.[7] .................................................. G05B 9/02
(52) U.S. Cl. ........................................ 702/186; 702/182
(58) Field of Search ................................ 702/186, 182; 700/15, 17, 83, 95, 99–102, 108, 111, 117, 114, 218, 213; 414/274; 717/174; 340/568.1–568.2

(56) References Cited

U.S. PATENT DOCUMENTS

| | | | |
|---|---|---|---|
| 1,403,048 A | 1/1922 | Mecorney ..................... 340/525 |
| 4,706,208 A | 11/1987 | Helms .......................... 702/118 |
| 4,980,836 A * | 12/1990 | Carter et al. ................. 713/322 |
| 5,424,956 A * | 6/1995 | Akamaru ...................... 700/117 |
| 5,434,775 A | 7/1995 | Sims et al. ...................... 705/8 |
| 5,557,559 A | 9/1996 | Rhodes ......................... 702/118 |
| 5,574,637 A | 11/1996 | Obata et al. ................... 700/2 |
| 5,880,955 A * | 3/1999 | Matoba et al. ................ 700/83 |
| 5,961,604 A | 10/1999 | Anderson et al. ........... 709/229 |
| 6,026,378 A | 2/2000 | Onozaki ....................... 705/28 |
| 6,107,928 A | 8/2000 | Gatti ........................ 340/686.1 |
| 6,154,728 A | 11/2000 | Sattar et al. ................... 705/28 |

* cited by examiner

*Primary Examiner*—Marc S. Hoff
*Assistant Examiner*—Craig Steven Miller
(74) *Attorney, Agent, or Firm*—Haynes and Boone, LLP

(57) ABSTRACT

An apparatus for processing items of electronic equipment, such as downloading software to and/or testing PC system units, includes a rack having a plurality of cells each for accommodating a respective unit to be processed. Each location has a visible indication, e.g. a colored light, of the instantaneous processing state of the location, such as: cell empty, processing in progress, processing successfully completed, processing failed and unable to commence processing. Each cell also includes a timer to measure the period of time for which the cell has been in the state indicated by the visible indication.

18 Claims, 2 Drawing Sheets

APPARATUS FOR PROCESSING ITEMS OF ELECTRONIC EQUIPMENT

This application shares inventorship with U.S. application Ser. No. 09/237,761, filed Jan. 26, 1999, now abandoned, U.S. Pat. No. 6,279,156, issued Aug. 21, 2001 and U.S. Pat. No. 6,279,155, issued Aug. 21, 2001. The application and patents are incorporated herein by reference in their entirety, and are assigned to the assignee of the present application.

BACKGROUND

The disclosures herein relate to an apparatus for processing items of electronic equipment, especially but not exclusively to downloading software onto and testing a personal computer (PC) system unit.

The final stages of the manufacture of a personal computer (PC) with pre-loaded software require the software to be downloaded onto the PC system unit and for the PC system unit to be extensively tested. To this end, a number of PC system units are placed in individual docking stations (herein referred to as cells) in a so-called "burn rack". The cells are connected via a network to one or more servers and software is downloaded from the servers to the client system units and tested via the network.

In build-to-order (BTO) operations individual PC system units are built to the customer's hardware and software specifications from a range of available options. In such a case each system unit may occupy the rack for a different length of time, according to the amount of software to be downloaded and the tests required to be performed. One of the biggest challenges to BTO operations is to optimize the burn rack traffic, by reducing the time units spend in the burn rack, which in turn enhances the success of the BTO model to deliver a better quality service with respect to time and cost per unit.

The task is non-trivial and indeed represents the core of a high capacity, high velocity manufacturing process, as high speed manufacturing is required in order to cope with the desired high volume production (400–800 PC/h per line).

Therefore, what is needed is a burn rack which can facilitate such optimization.

SUMMARY

One embodiment, accordingly, provides an apparatus for processing items of electronic equipment. The apparatus includes a rack having at least one location for accommodating a respective item to be processed. The location has a visible indication of the instantaneous processing state of that location.

A principal advantage of this embodiment is that the dwell time over one hour of production in one factory can be substantially reduced, as will be explained further.

DETAILED DESCRIPTION

Figure 1:
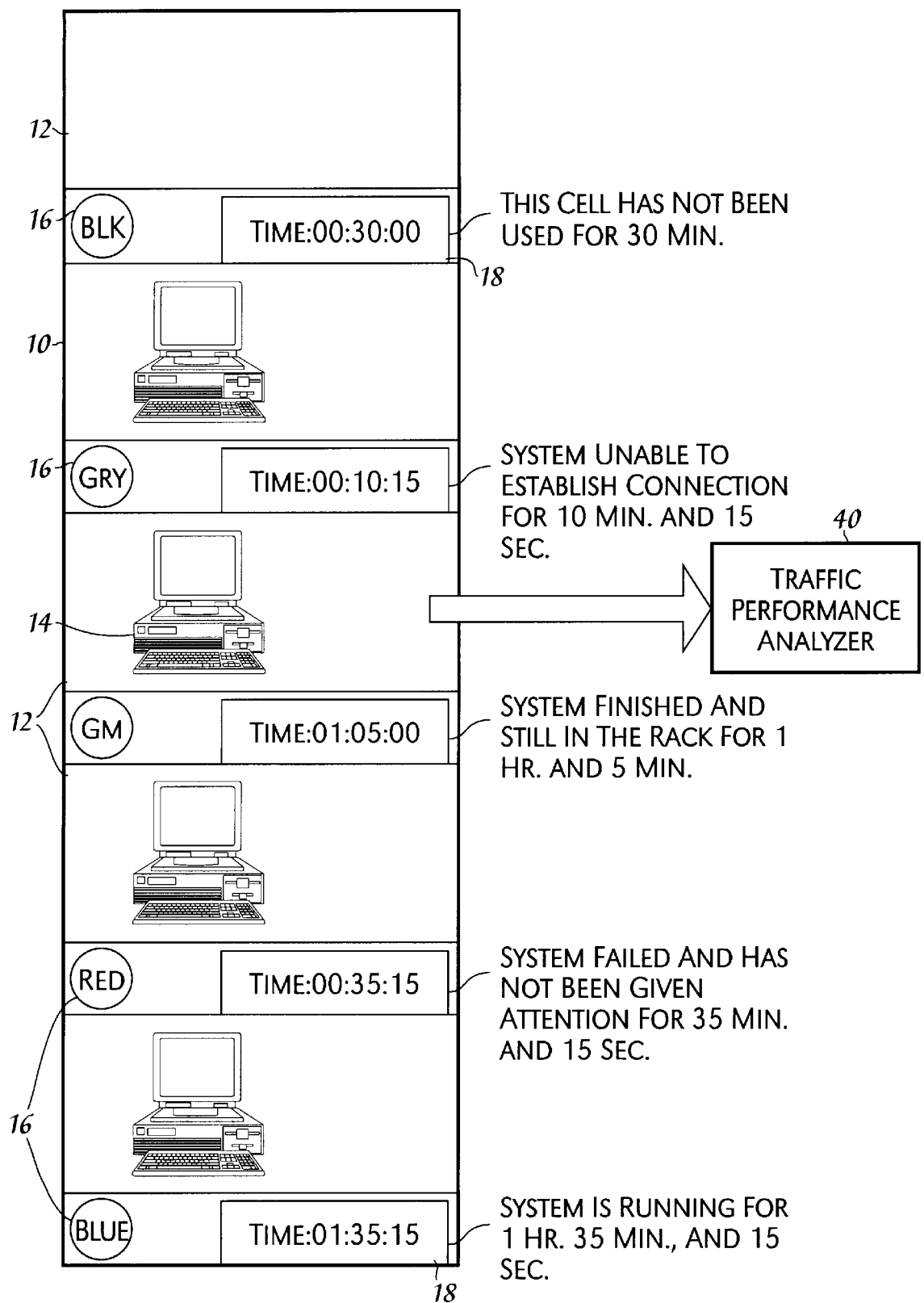
FIG. 1 is a schematic diagram of a burn rack according to one embodiment.

In FIG. 1, a burn rack 10 has a plurality of individual cells 12, in this embodiment five cells, although the rack may have more or less cells including, in an extreme case, just a single cell. Each cell 12 can accommodate a respective PC system unit 14, which can be plugged into the cell for software download and/or system unit testing.

On the front of each cell 12 there is a group 16 of four indicator lamps, each of which glows a different color when lighted, e.g. gray, green, red and blue respectively. In FIG. 1 the circle indicated by the reference 16 refers to the group of four lamps and the legend within the circle indicates the lamp which is currently lighted within the group, e.g. Gry (gray), Grn (green), Red or Blue. Blk (black) means that none of the four lamps is lighted. The group of lamps 16 is referred to herein as the Cell Status Indicator (CSI).

Monitoring software within or associated with each cell 12 monitors the network traffic between the cell and the server(s) which supplies the downloaded software, performs the tests, and lights the appropriate lamp within the CSI 16 according to the instantaneous state of the cell:

| | |
|---|---|
| CSI = Black: | the cell is free (empty) |
| CSI = Gray: | the cell is occupied with a system unit which is unable to or has not yet established connection to the server and therefore unable to commence processing (downloading and/or testing). This is referred to as "Out of Scope". |
| CSI = Red: | the cell is occupied with a system unit whose processing has failed (i.e. unsuccessful download and/or testing). |
| CSI = Blue: | the cell is occupied with a system unit that is successfully undergoing processing. |
| CSI = Green: | the cell is occupied with a system unit that has finished processing and is ready to leave the rack. |

It will be understood that in FIG. 1 each of the cells 12 is shown in a different state (i.e. the CSIs are all different) for the sake of explanation. Obviously, in practice there will be periods when there are two or more cells simultaneously in the same state while one or more states will not occur in any of the cells.

The state monitoring software also has a timer which measures the period of time for which each cell 12 has been in the state indicated by its CSI 16. This time period is preferably displayed on a clock 18 located on the front of each cell next to the CSI 16. The time periods shown on the clocks 18 in FIG. 1 are solely by way of example and an explanation of the CSI status and associated time period for each cell is given on the right hand side of the rack. It will be recognized that the provision of cell state monitoring software to drive the CSIs 16 and clocks 18 is well within the capabilities of those skilled in the art.

Figure 2:
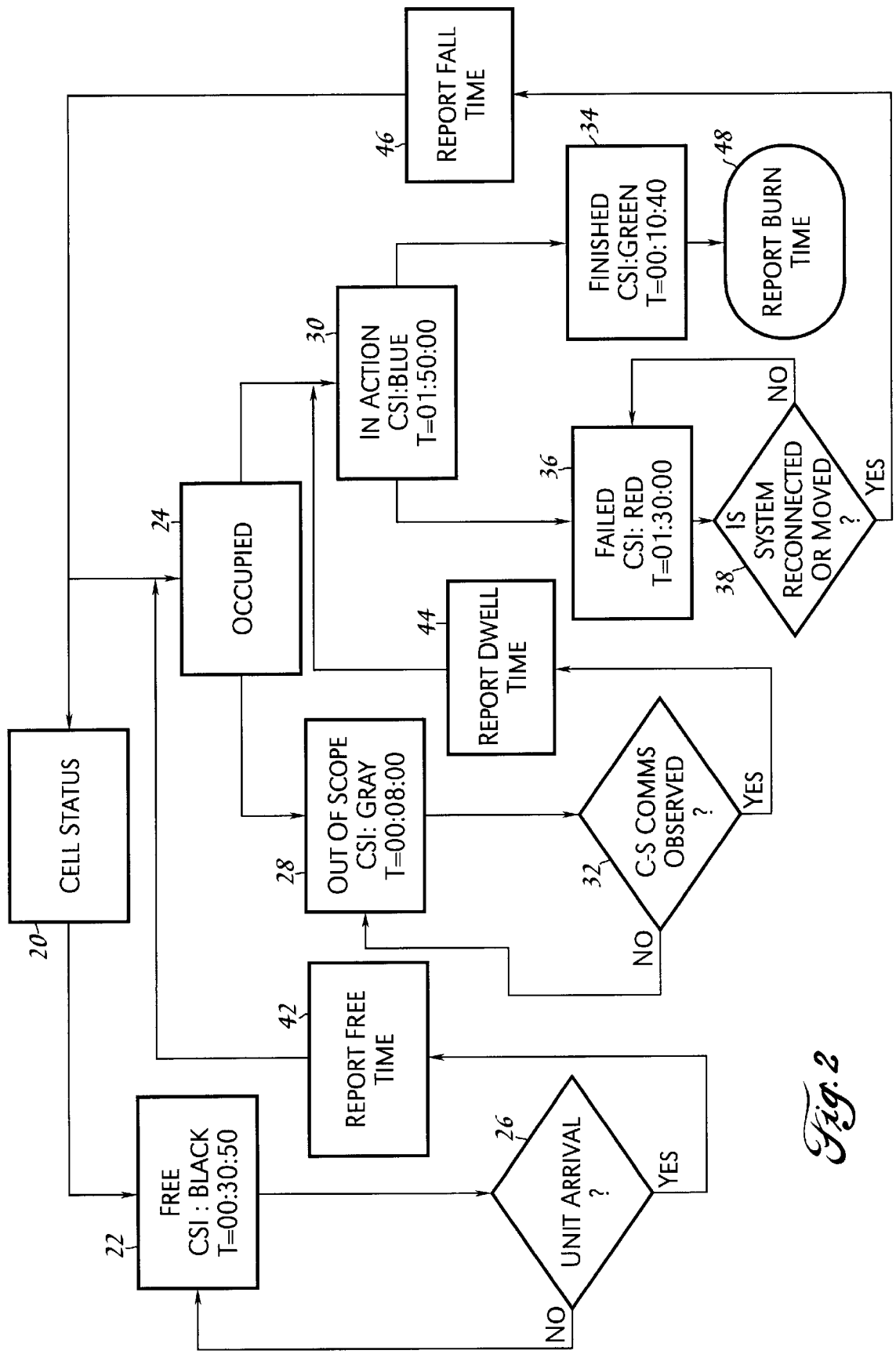
FIG. 2 is a state diagram of the burn rack.

FIG. 2 is a state diagram of a single cell 12 (the time periods shown are for illustration only). In FIG. 2, blocks 42 to 48 should be ignored for the moment. The cell status 20 is either free (block 22) or occupied (block 24). If free, the CSI remains Black until a system unit arrives at the cell (block 26), whereupon the CSI will change to Gray (block 28) or Blue (block 30) according to circumstances. If the CSI is Gray the monitoring software waits for client-server (C-S) communications (block 32) and if C-S communications is established the CSI changes to Blue (block 30). From Blue the CSI can change to Green (block 34) if the processing is successfully complete or Red (block 36) if the processing has failed at any point. In the latter case the system unit is revisited (block 38), either to reconnect it, if it is thought that the connections may have come loose, or to remove it.

The rack 10, including the CSIs 16 and clocks 18, provides a substantially enhanced of level of intersection between the rack and the rack operator, making it easy for the operator to recognize the status of a system unit on the rack and to react immediately to address any issues. However, further benefit is achieved in this embodiment by supplying the state and time period data determined by the state monitoring software to a data determined by the state monitoring software to a data analyzer (herein referred to as a Traffic Performance Analyzer, or TPA) 40, FIG. 1.

Thus, referring again to FIG. 2, when the CSI 16 of a cell 12 changes from CSI=Black (block 22) to Gray (block 28) or Blue (block 30), the change of state and the time period for which the cell was in state CSI=Black (free time) is reported (block 42) by the state monitoring software to the TPA 40. Likewise, the state change from CSI=Gray and the time period for which the cell was in state CSI=Gray (dwell time) is reported at block 44, and the state change from CSI=Red and the time period for which the cell was in state CSI=Red (fail time) is reported at block 46. Finally, at block 48 the monitoring software also reports the total burn time for a successfully processed system unit, i.e. the total time spent in states CSI=Blue and CSI=Green.

The TPA 40 uses standard statistical techniques to derive statistical data useful for management. For example, the distribution of free, dwell and fail times over a shift, or longer period, can provide useful information regarding operator efficiency and identify congested periods for network traffic. Such statistical data can promote full utilization of the burn rack cells by identifying the exact utilization of the burn racks over a certain period of time, i.e. the ratio of the system units in process to all system units in the rack (finished, failed, and those not being able to establish connection with the network). Such data can also promote a homogenous traffic flow between the build cells (locations where the PCs are physically assembled) and the burn rack by identifying the average time for pushing a new unit to a free cell in the burn racks.

As an example of the benefit to be obtained by this disclosure, suppose that the average dwell time, over a certain period of time, is 20 minutes. If by improving the network traffic conditions we can reduce this time to 10 minutes, for example, and if we have 7 lines each running at 200 units per hour (uph), then we can eliminate 233 hours (200×10×7≅233) dwell time over one hour of production in one factory.

As another example, reducing the average time required to load units to cells from 15 minutes (for example) to 5 minutes, will speed up the traffic and cut down on the processing time by 10 minutes.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. An apparatus for processing items of electronic equipment, comprising:
    a rack having a plurality of locations for accommodating a respective item to be processed;
    the locations having a visible indication of an instantaneous processing state of each location;
    a timer to measure a period of time for which the locations have been in the states indicated by the visual indication; and
    a data analyzer providing statistical data derived from the states of the locations and the times for which the locations have been in each state.

2. An apparatus according to claim 1, further comprising: a clock displaying the period of time.

3. An apparatus according to claim 1, wherein the items of electronic equipment comprise personal computer system units, and wherein the processing comprises downloading software to the system units and/or testing such units.

4. An apparatus according to claim 1, wherein the processing states include at least one of: location empty, processing in progress, processing successfully completed, processing failed and unable to commence processing.

5. An apparatus according to claim 1, wherein the visible indication comprises a plurality of colored lights, each light being of a different color than each other light.

6. An apparatus for processing computers during manufacture comprising:
    a rack having at least one location for accommodating a computer to be processed;
    the at least one location having distinct visible indications of an instantaneous processing state of the location; and
    the visible indications being an indicator that the location is:
        free to be occupied for processing;
        occupied without being connected for processing;
        occupied and processing is being accomplished;
        occupied and processing is completed; or
        occupied and processing has failed.

7. An apparatus according to claim 6, further comprising: a timer to measure a period of time for which the at least one location has been in the state indicated by the visible indication.

8. An apparatus according to claim 7, further comprising: a clock displaying the period of time.

9. An apparatus according to claim 7, wherein the rack has a plurality of the locations.

10. An apparatus according to claim 9, wherein the processing comprises downloading software to the computers and/or testing such computers.

11. An apparatus according to claim 9, further comprising: a data analyzer providing statistical data derived from the states of the locations and the times for which the locations have been in each state.

12. A method for processing computers during manufacture comprising:
    providing a rack having a location for accommodating a computer to be processed;
    connecting distinct visible indications of an instantaneous processing state of the location; and
    varying the visible indications so as to indicate that the location is:
        free to be occupied for processing;
        occupied without being connected for processing;
        occupied and processing is being accomplished;
        occupied and processing is completed; or
        occupied and processing has failed.

13. The method according to claim 12 further comprising: measuring a period of time for which the location has been in the state indicated by the visible indication.

14. The method according to claim 13 further comprising: displaying the period of time on a clock.

15. The method according to claim 14 further comprising: providing a plurality of locations; and
    providing a data analyzer for statistical data from the state of each location and the time for which each location has been in each state.

16. An apparatus for processing computers during manufacture comprising:

a rack having a location for accommodating a computer to be processed;

the location having distinct visible indications of an instantaneous processing state of the location; and the visible indications being an indicator that the location is:
 free to be occupied for processing; or
 occupied; and
  if occupied, the state of the processing at the location.

17. The apparatus according to claim 16, further comprising:
a timer to measure a period of time for which the location has been in the state indicated.

18. An apparatus for processing items of electronic equipment comprising:

a rack having a location for accommodating a respective item to be processed;

the location having a visible indication of an instantaneous processing state of the location; and the visible indication being an indicator that the location is:
 free to be occupied for processing; or
 occupied; and
  if occupied, the state of processing at the location.

* * * * *